(12) United States Patent
Da Rocha

(10) Patent No.: US 11,619,159 B2
(45) Date of Patent: Apr. 4, 2023

(54) HEAT EXCHANGER ARRANGEMENT, SCREEN, AND METHOD FOR PROTECTING A HEAT EXCHANGER ARRANGEMENT

(71) Applicant: VOLVO TRUCK CORPORATION, Gothenburg (SE)

(72) Inventor: Edervan Messias Da Rocha, Curitiba (BR)

(73) Assignee: VOLVO TRUCK CORPORATION, Gothenburg (SE)

( * ) Notice: Subject to any disclaimer, the term of this patent is extended or adjusted under 35 U.S.C. 154(b) by 223 days.

(21) Appl. No.: 16/962,424

(22) PCT Filed: Jan. 19, 2018

(86) PCT No.: PCT/BR2018/050010
§ 371 (c)(1),
(2) Date: Jul. 15, 2020

(87) PCT Pub. No.: WO2019/140498
PCT Pub. Date: Jul. 25, 2019

(65) Prior Publication Data
US 2021/0071564 A1  Mar. 11, 2021

(51) Int. Cl.
*F01P 5/06* (2006.01)
*F28F 19/00* (2006.01)
(Continued)

(52) U.S. Cl.
CPC ...... *F01P 5/06* (2013.01); *F01P 3/18* (2013.01); *F01P 3/20* (2013.01); *F02M 26/22* (2016.02); *F02M 31/20* (2013.01); *F28F 19/00* (2013.01); *F28F 19/02* (2013.01); *B60K 11/04* (2013.01); *B60R 13/0876* (2013.01); *F01P 2060/04* (2013.01); *F28F 2265/02* (2013.01)

(58) Field of Classification Search
CPC ........ F01P 5/06; F01P 3/18; F01P 3/20; F01P 2060/04; F02M 26/22; F02M 31/20; F28F 19/00; F28F 2265/02; F28F 19/02; B60K 11/04; B60R 13/0876
See application file for complete search history.

(56) References Cited

U.S. PATENT DOCUMENTS 1,039,480 A  9/1912 Bassett
1,496,681 A  6/1924 Dreier
(Continued)

FOREIGN PATENT DOCUMENTS

DE  19755252 A1  6/1999
GB  447055 A  5/1936
JP  H0588619  12/1993

OTHER PUBLICATIONS

International Search Report (dated Nov. 27, 2018) for corresponding International App. PCT/BR2018/050010.
(Continued)

*Primary Examiner* — Jacob M Amick
(74) *Attorney, Agent, or Firm* — WRB-IP LLP

(57) ABSTRACT

A heat exchanger arrangement includes a heat exchanger having a front, a rear, and a side between the front and the rear, a fan arranged to direct an airflow from the front to the rear of the heat exchanger, and a screen disposed over at least the front and side of the heat exchanger and attached to a structure at or behind the rear of the heat exchanger.

19 Claims, 5 Drawing Sheets

(51) Int. Cl.
*B60K 11/04* (2006.01)
*B60R 13/08* (2006.01)
*F02M 26/22* (2016.01)
*F01P 3/18* (2006.01)
*F01P 3/20* (2006.01)
*F02M 31/20* (2006.01)
*F28F 19/02* (2006.01)

(56) References Cited

U.S. PATENT DOCUMENTS

| | | | |
|---|---|---|---|
| 2,054,187 A | | 9/1936 | Dale |
| 2,920,829 A | * | 1/1960 | Shane ................ B60H 1/00295 |
| | | | 237/12.3 A |
| 4,169,401 A | | 10/1979 | Takeuchi et al. |
| 6,810,950 B1 | | 11/2004 | Manze |
| 2008/0072558 A1 | | 3/2008 | Tsuchihashi et al. |
| 2008/0283220 A1 | | 11/2008 | Martin et al. |

OTHER PUBLICATIONS

European Official Action (dated Oct. 21, 2011) for corresponding European App. EP 18 90 0589.

\* cited by examiner

HEAT EXCHANGER ARRANGEMENT, SCREEN, AND METHOD FOR PROTECTING A HEAT EXCHANGER ARRANGEMENT

BACKGROUND AND SUMMARY

The present invention relates generally to heat exchanger arrangements and, more particularly, to heat exchanger arrangements with anti-clogging/filtering structures.

A conventional heat exchanger arrangement 121 is shown in FIGS. 1, 2A, and 3A. The heat exchanger arrangement comprises a heat exchanger 23 having a front 25, a rear 27, and a side 29 between the front and the rear. Vehicles such as heavy trucks may have, in addition to an engine coolant heat exchanger (commonly referred to as a radiator), an exhaust gas recirculation (EGR) cooler, a charger air cooler, and an engine oil heat exchanger. These various types of heat exchangers may be mounted on the vehicle so as to receive a cooling air flow. For the purposes of the present application, references to a "heat exchangers" shall be understood to include the vehicle radiator and other heat exchangers such as might be used on a vehicle.

A fan 31 (FIGS. 3A-3B) is arranged to direct an airflow from the front to the rear of the heat exchanger 23. The fan 31 in the illustrated embodiment is disposed at the rear 27 of the heat exchanger 23 and is arranged to draw air through the heat exchanger from the front 25 to the rear 27, however, it will be appreciated that the fan might instead be disposed at the front of a heat exchanger and arranged to force air from the front to the rear of heat exchanger.

In the illustrated embodiment, a fan shroud 37 to help guide the airflow is attached around the fan 31 (FIGS. 3A-3B). The fan shroud 37 can be attached to the heat exchanger 23 or some other structure. The fan shroud 37 may be omitted. The heat exchanger arrangement 121 typically also includes a frame 41 for supporting the heat exchanger 23 and attaching it to other structures, and brackets 43 on the frame to facilitate attaching the frame and heat exchanger in an engine compartment.

In many operating environments, dust, dirt, insects, and other debris are drawn against the heat exchanger 23 and clog openings through which cooling air is intended to pass, reducing the efficiency of the heat exchanger. It is known to provide a removable and cleanable or replaceable "bug net" across the front of some heat exchangers, however, bug nets have been found to be useful primarily when the vehicle tends to travel at relatively high speeds, such as in long-haul trucking applications. A bug net is less useful in applications involving low speeds and/or dirty environments, such as in sugar cane farming, mining, and off-road environments, where dust, dirt, debris, and other matter can clog the heat exchanger, collecting on the front and intruding between heat exchanger structures on the sides and rear of the heat exchanger. Because of this problem in vehicles intended for such applications, it is common to over-dimension the cooling system to account for the likelihood that the heat exchanger efficiency will fall with use. The heat exchangers can be cleaned, however, a cleaning operation takes the vehicle out of service, decreasing vehicle availability and productivity, and requires customers to have facilities for washing the heat exchangers.

It is desirable to provide a heat exchanger arrangement that can facilitate keeping dirt and other debris from clogging openings in the heat exchanger and that facilitates simple maintenance.

In accordance with an aspect of the present invention, a heat exchanger arrangement comprises a heat exchanger having a front, a rear, and a side between the front and the rear, a fan arranged to direct an airflow from the front to the rear of the heat exchanger, and a screen disposed over at least the front and side of the heat exchanger and attached to a structure at or behind the rear of the heat exchanger.

In accordance with another aspect of the present invention, a heat exchanger screen for a heat exchanger arrangement is provided, the heat exchanger arrangement comprising a heat exchanger having a front, a rear, and a side between the front and the rear, and a fan arranged to direct an airflow from the front to the rear of the heat exchanger, the heat exchanger screen comprising a screen adapted to be disposed over at least a front and a side of a heat exchanger and attached to a structure at or behind the rear of the heat exchanger.

In accordance with another aspect of the present invention, a method for protecting a heat exchanger arrangement is provided, the heat exchanger arrangement comprising a heat exchanger having a front, a rear, and a side between the front and the rear, and a fan arranged to direct an airflow from the front to the rear of the heat exchanger, the method comprising placing a screen over at least the front and side of the heat exchanger, and attaching the screen to a structure at or behind the rear of the heat exchanger.

The heat exchanger arrangement, the screen, and method according to aspects of the present invention uses a screen to facilitate preventing clogging of passages in a heat exchanger not only along the front of the heat exchanger, but also along the sides, by preventing dirt, debris, and other matter from reaching parts of the heat exchanger into which air is drawn or getting between heat exchangers or parts of heat exchangers in a mounted arrangement, as opposed to those parts at the rear from which air exits. In addition, where convenient, even the parts of the heat exchanger from which air exits the heat exchanger can be covered by the screen.

The screen can be easily removed for replacement or periodic cleaning.

Screens can be configured to fit particular heat exchanger arrangements, but can also be configured to be installed over a wide range of heat exchanger arrangement shapes. Screens can be retrofit on existing equipment or designed to fit new equipment.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
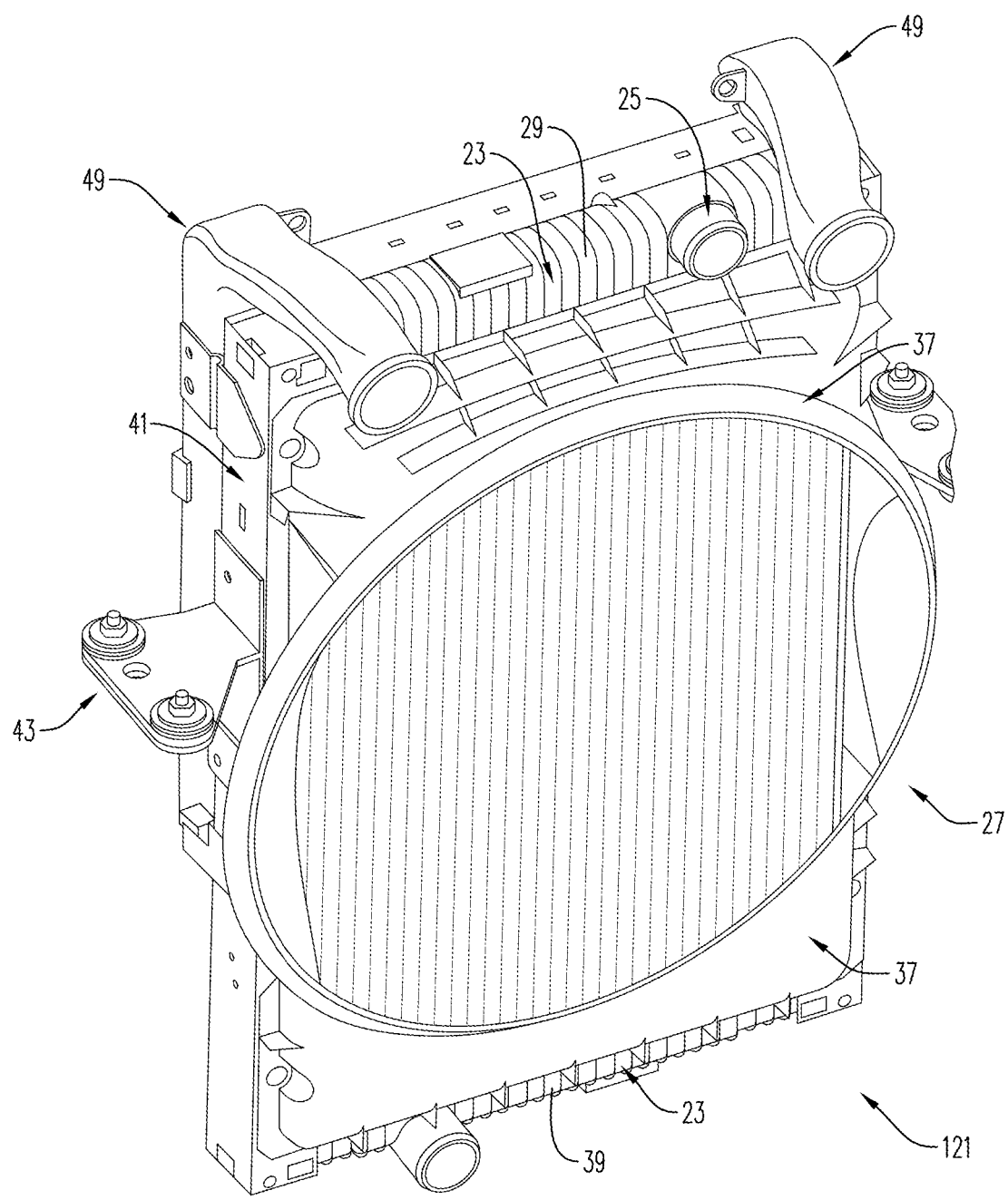
FIG. 1 is a perspective view of a heat exchanger arrangement according to the prior art.
Figure 2A:
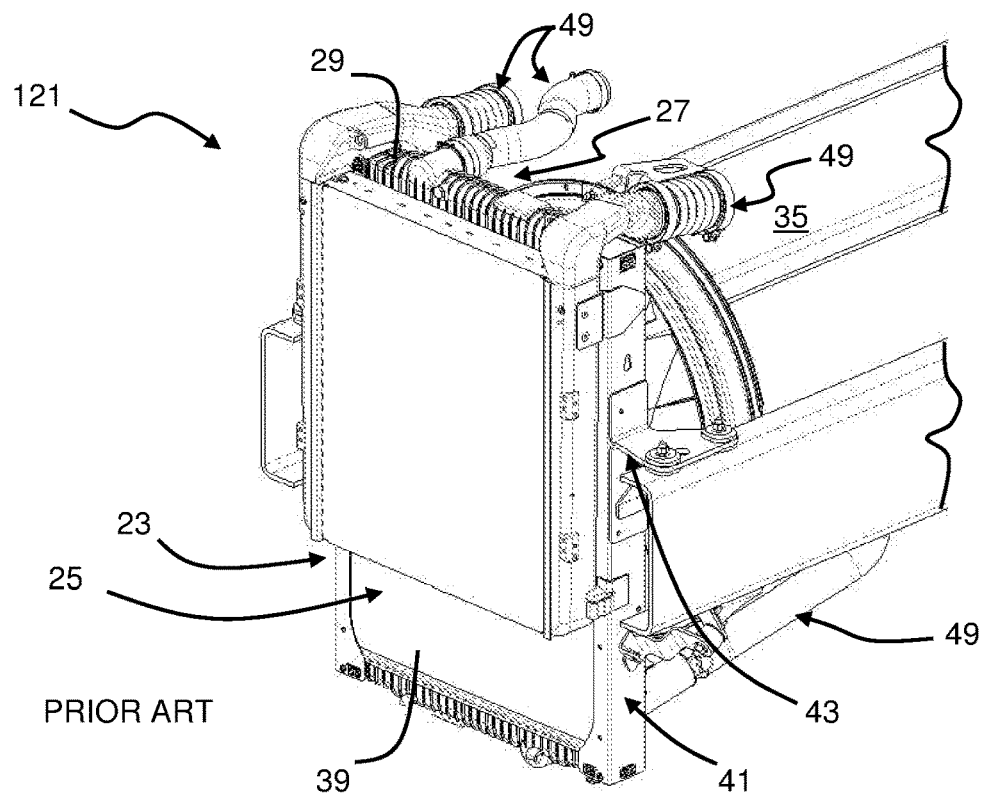
FIG. 2A is a perspective view of a front of a prior art heat exchanger arrangement.
Figure 2B:
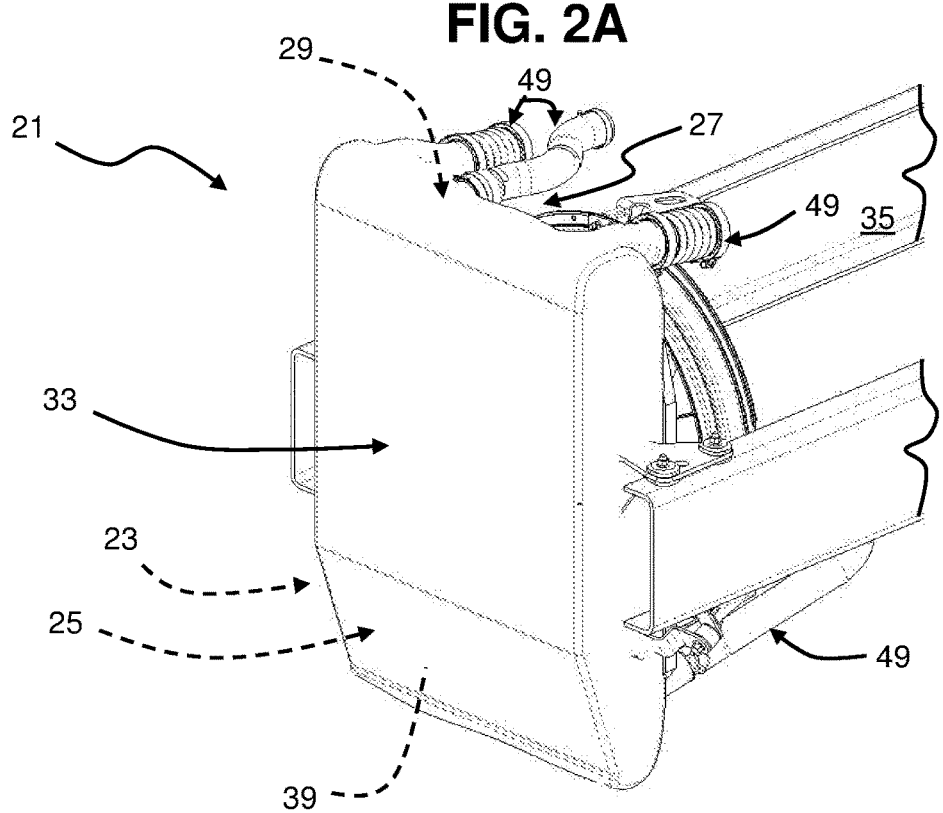
FIG. 2B is a perspective view of a front of a heat exchanger arrangement according to an aspect of the present invention.
Figure 3A:
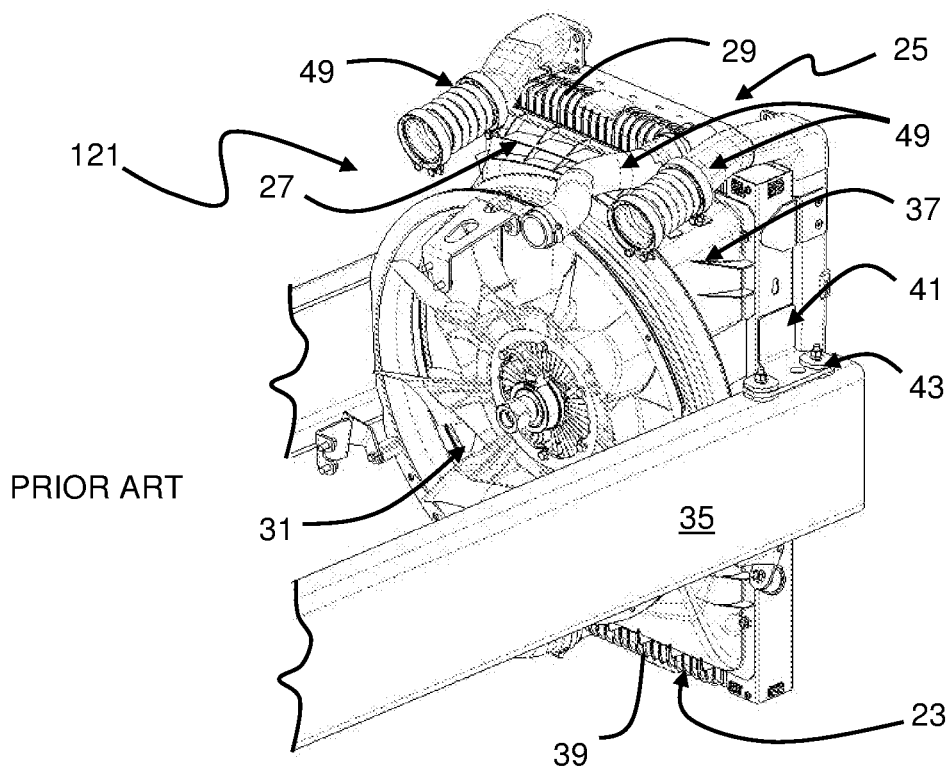
FIG. 3A is a perspective view of a rear of a prior art heat exchanger arrangement.
Figure 3B:
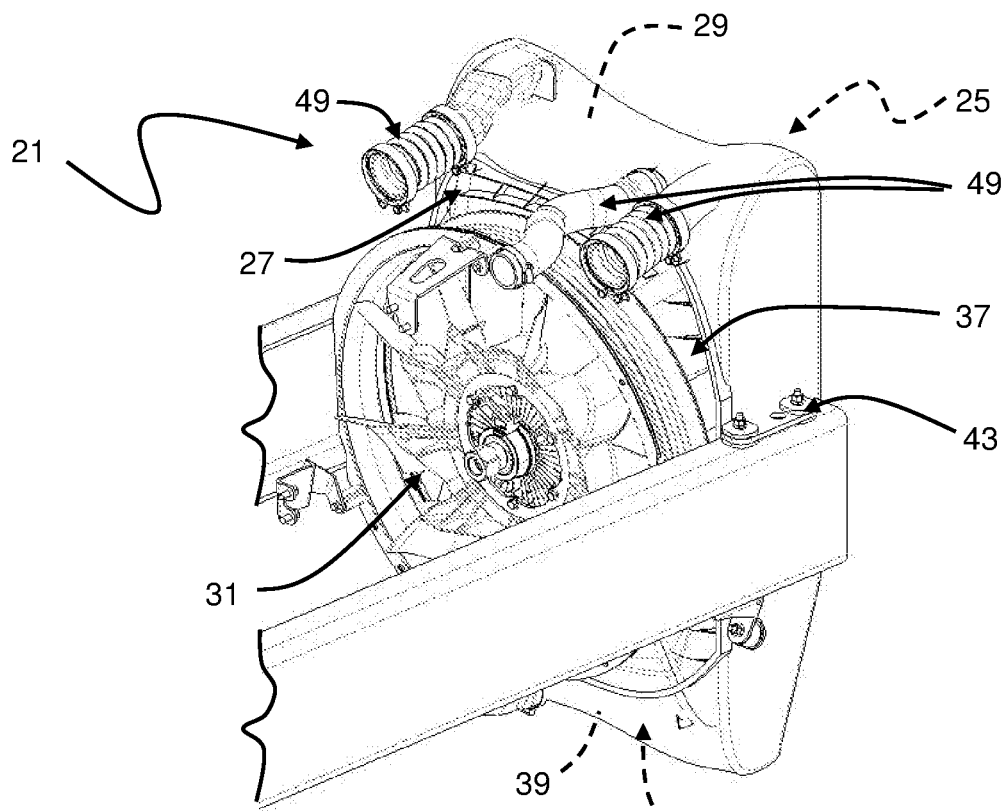
FIG. 3B is a perspective view of a rear of a heat exchanger arrangement according to an aspect of the present invention.

A heat exchanger arrangement 21 according to an aspect of the present invention is shown in FIGS. 2B and 3B. The heat exchanger arrangement 21 comprises a heat exchanger 23 having a front 25, a rear 27, and a side 29 between the front and the rear, a fan 31 (FIGS. 3A-3B) arranged to direct an airflow from the front to the rear of the heat exchanger, and a screen 33 disposed over at least the front and side of the heat exchanger and attached to a structure 35 at or behind a rear of the heat exchanger. The heat exchanger may be an engine coolant heat exchanger (or radiator), and/or may include one or more of other heat exchangers, such as an EGR cooler, a charger air cooler, an engine oil cooler, or other coolers, particularly those used on vehicles. These heat exchangers use a cooling air flow over the heat exchanging structures, such as tubes and fins, to facilitate cooling heat transfer. The fan 31 in the illustrated embodiment is disposed at the rear 27 of the heat exchanger 23 and is arranged to draw air through the heat exchanger from the front 25 to the rear 27, however, it will be appreciated that the fan might instead be disposed at the front of a heat exchanger and arranged to force air from the front to the rear of heat exchanger. In substantially all respects other than the screen 33 and any additional structure used to secure the screen relative to the exchanger arrangement 21, the heat exchanger arrangement can be identical the heat exchanger arrangement 121 of FIGS. 1, 2A, and 3A.

The screen 33 will ordinarily be made of a material having a mesh opening that is permeable to air but small enough to block dust, dirt, debris, and other matter that would tend to clog the heat exchanger 23. Different mesh sizes may be appropriate for different environments.

In FIGS. 3A and 3B, a fan shroud 37 is attached around the fan 31. The fan shroud 37 can be attached to the heat exchanger 23. The fan shroud 37 can be omitted, however, it can provide a convenient structure 35 to which the screen 33 can be attached. The screen 33 can be attached to any suitable structure at or behind the rear of the heat exchanger 23, including but not limited to the fan shroud 37, a heat exchanger tank 39, a heat exchanger frame 41, and a heat exchanger bracket 43. The screen 33 can also be attached to itself at or behind the rear of the heat exchanger 23, or to the rear of the heat exchanger.

The screen 33 can be but is not necessarily disposed over at least part of the rear 27 of the heat exchanger 23, i.e. in a direction of the flow of air out of the heat exchanger. If other structures, such as a fan shroud 37, cover the entire rear 27 of the heat exchanger, there is less chance for dirt and debris to clog the rear of the heat exchanger, particularly if air is flowing out of the rear of the heat exchanger. In such circumstances, it may be desirable to have the screen 33 extend only around a periphery of the rear 27 of the heat exchanger 23 so that the dirt and debris does not collect on the periphery of the heat exchanger. Even if there is no other structure disposed at the rear 27 of the heat exchanger 23, an improvement can be provided by simply having the screen 33 disposed at or behind the rear of the heat exchanger without actually being disposed over part of the rear of the heat exchanger.

Figure 4A:
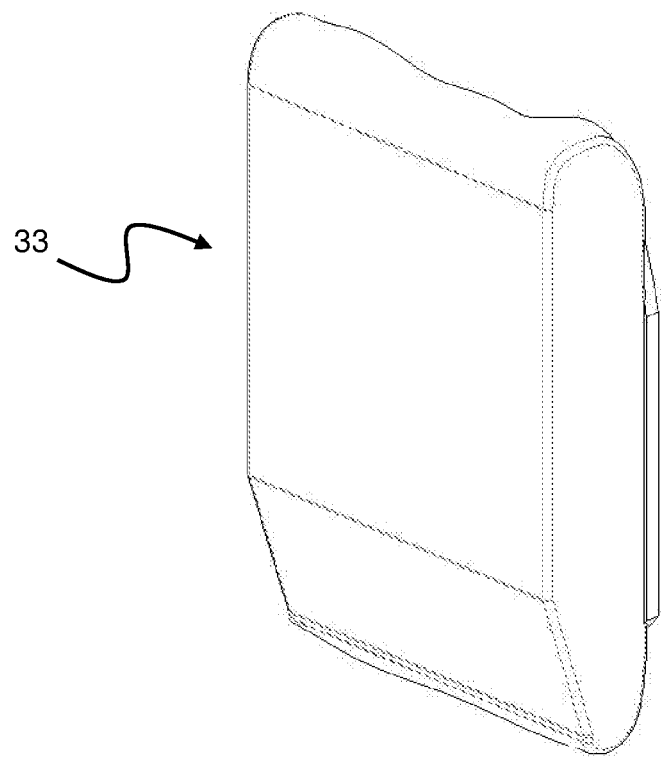
FIG. 4A is a perspective view of a front of a screen for a heat exchanger arrangement according to an aspect of the present invention.
Figure 4B:
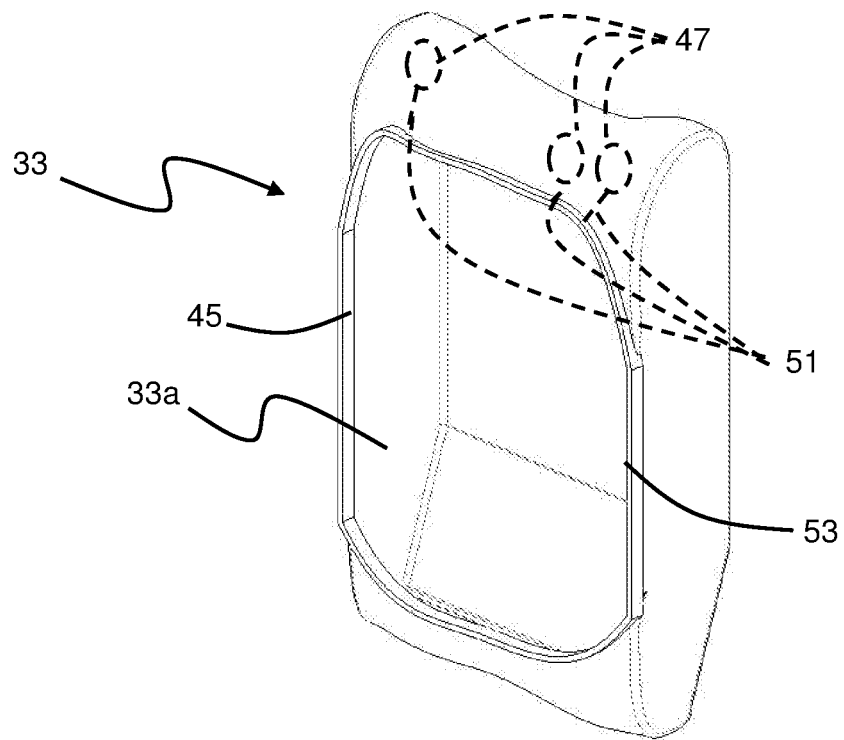
FIG. 4B is a perspective view of a rear of a screen for a heat exchanger arrangement according to an aspect of the present invention.

As seen in FIG. 4B, fastening means 45 is provided for removably attaching the screen 33 to the structure 35 at or behind the rear of the heat exchanger 23. The fastening means 45 can be any suitable, preferably easily fastened and unfastened, type of fastener, such as a hook and pile fastener such as a VELCRO fastener, snap fasteners, zippers, buttons, elastic bands, or draw strings. It is presently contemplated that a hook and pile type of fastener will ordinarily be most advantageous because of ease of fastening, as well as the ease with which they can adapted to fasten around odd shapes around the heat exchanger arrangement. For example, the fastening means 45 may be formed by securing a hook or pile fastener in a suitable fashion, such as by an adhesive, to a structure 35 at or behind the heat exchanger 23, and by further securing a mating pile or hook fastener around the edges of a hole 33a (FIG. 4B) defined by peripheral edges 53 of the screen 33 through which the heat exchanger is intended to extend to form the fastening means 45. While a hook and pile fastener is presently believed to be preferred, other types of fasteners might be more appropriate for different applications.

An embodiment of a screen 33 such as might be used in a heat exchanger arrangement as shown in FIGS. 2B and 3B is seen in FIGS. 4A and 4B. In the embodiment shown in FIGS. 4A and 4B, the screen 33 can have a single rear opening 33a around which the fastening means 45 extends, and the heat exchanger 23 can be placed inside the screen by pulling the screen over the heat exchanger in the manner of a shower cap and fastening the screen over the heat exchanger as shown in FIGS. 2B and 3B.

Figure 5A:
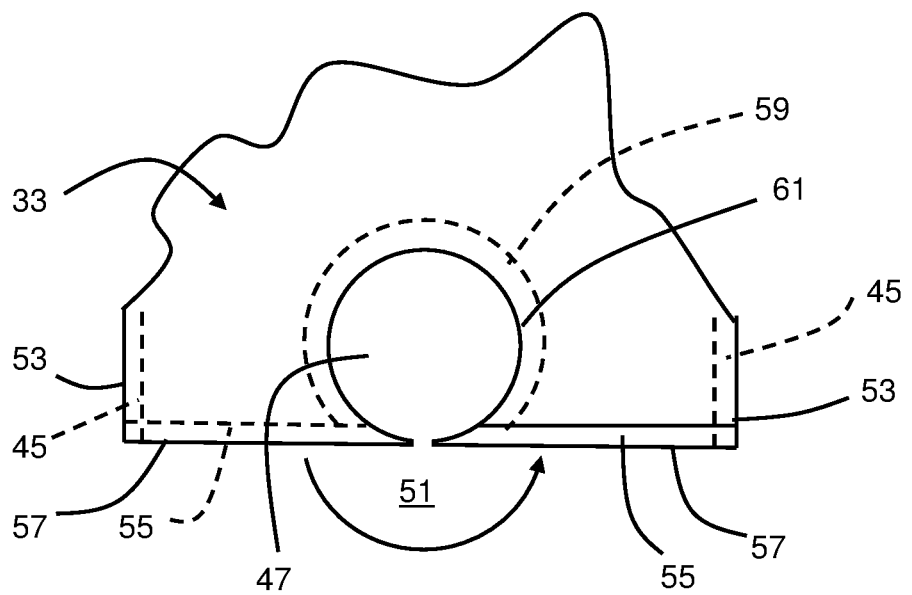
FIG. 5A is a view of a part of a screen for a heat exchanger arrangement according to an aspect of the present invention with the screen laid out flat so that a slit in the screen leading to a hole in the screen is open.
Figure 5B:
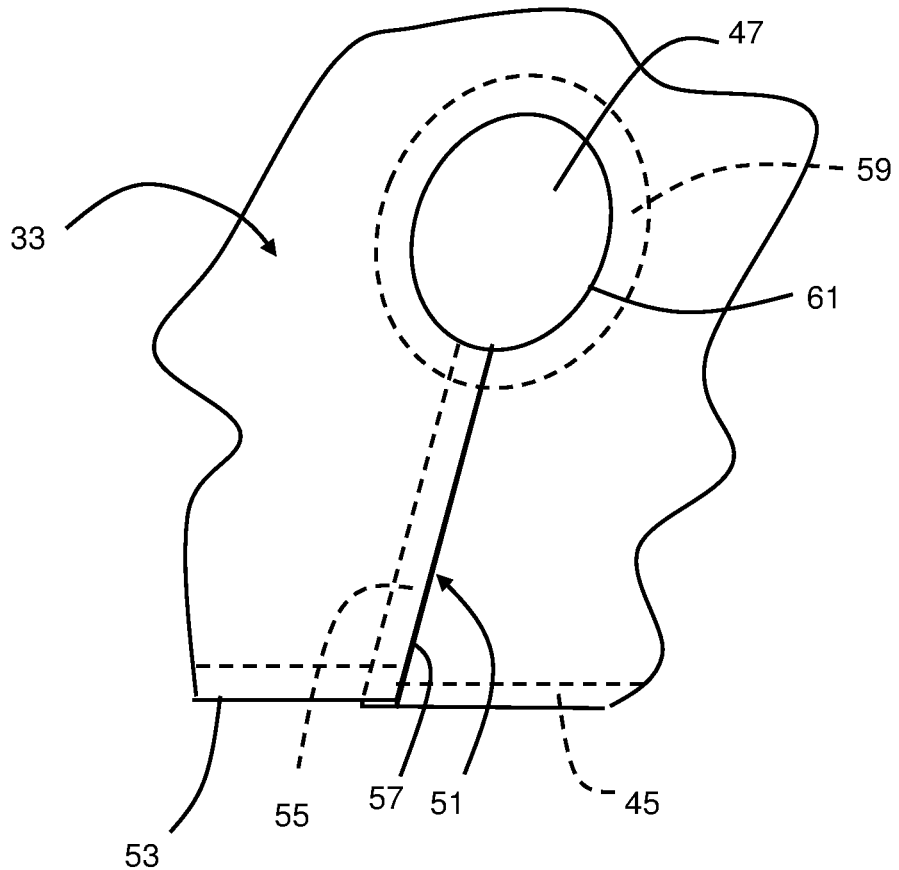
FIG. 5B is a view of the part of a screen for a heat exchanger arrangement of FIG. 5A showing with edges of the slit leading to the hole joined together.

To accommodate complex shapes, conduits, or other structures extending from or near the heat exchanger 23, the screen 33 can comprise at least one hole 47 therein as seen, for example, in FIGS. 5A and 5B (and seen in phantom in FIG. 4B), the hole being substantially larger than openings of a mesh of the screen. The hole 47 facilitates extending components such as conduits 49 (e.g., charge air cooler tank conduits, coolant conduits, etc.), frames 41, brackets 43 and the like through the hole in the screen 33. The screen 33 may further comprise at least one slit 51 therein, the slit extending from a peripheral edge 53 of the screen to the at least one hole 47 to facilitate attaching the screen around and removing the screen from around such components without the need to detach the components from other structures to which they are attached in order to extend the components through the hole 47.

FIG. 5A shows part of the screen 33 laid out flat so that a slit 51 in the screen 33 leading to a hole 47 in the screen is open, the open slit being defined between the edges 57 of the slit. In this condition, the screen 33 can be fitted around a component such as a conduit by putting the conduit through the hole. FIG. 5B is a view of the part of the screen 33 of FIG. 5A showing the edges of the slit leading to the hole joined together. Slit fastening means 55 can be provided on the screen 33 for fastening edges 57 of the slit 51 to each other. As with the fastening means 45, the slit fastening means 55 can be any suitable, preferably easily fastened and unfastened, type of fastener, such as a hook and pile fastener such as a VELCRO fastener, snap fasteners, zippers, buttons, elastic bands, or draw strings. It is presently contemplated that a hook and pile type of fastener will ordinarily be most advantageous because of the ease with which they facilitate fastening and the ease with which they can adapted to fasten around odd shapes around the heat exchanger arrangement, however, other types of fasteners might be more appropriate for different applications.

Component fastening means 59 can be provided on the screen 33 and, if desired or useful, on a component extending through the hole 47 for fastening edges 61 of the hole to the component. As with the fastening means 45 and the slit fastening means 55, the component fastening means can be any suitable, preferably easily fastened and unfastened, type of fastener, such as a hook and pile fastener such as a VELCRO fastener, snap fasteners, zippers, buttons, elastic bands, or draw strings. It is presently contemplated that a hook and pile type of fastener will ordinarily be most advantageous because of the ease with which they facilitate fastening and the ease with which they can adapted to fasten around odd shapes around the heat exchanger arrangement, however, other types of fasteners might be more appropriate for different applications. For example, a hook or pile fastener might be secured in a suitable fashion, such as by an adhesive, to a component such as a conduit 49, bracket 43, or frame 41, and a mating pile or hook fastener might be secured around the edges of the hole 47 through which the component is intended to extend to form the component fastening means 59.

The screen 33 is ordinarily flexible in the sense that it can be easily bent by hand and is movable from a substantially flat shape to a shape that is bent around the heat exchanger 23. The screen 33 may have a shape memory, however, it is presently contemplated that it will ordinarily be in the form of a highly flexible, light weight, fabric material. The screen 33 may be resilient and may be adapted to be stretched from a relaxed, flat shape to a bent, tensioned state around the heat exchanger 23.

In a method for protecting a heat exchanger arrangement 21 that comprises a heat exchanger 23 having a front 25, a rear 27, and a side 29 between the front and the rear, and a fan 31 arranged to direct an airflow from the front to the rear of the heat exchanger, a screen 33 is placed over at least the front and side of the heat exchanger, and the screen is attached to a structure 35 at or behind the rear of the heat exchanger. The screen 33 can be placed over at least part of the rear 27 of the heat exchanger 23.

The screen 33 facilitates preventing dust and other debris from entering and clogging flow passages through the heat exchanger 23 or collecting on the heat exchanger. If the screen 33 itself becomes clogged, it can be easily removed and cleaned or replaced. By providing the screen so that it is placed over at least the front 25 and side 29 of the heat exchanger 23 and is attached to a structure 35 at or behind the rear 27 of the heat exchanger, the possibility of dust and debris entering the flow passages or collecting on the heat exchanger as dust and debris at the rear of the heat exchanger will ordinarily be blown away from the heat exchanger by the fan that directs air through the heat exchanger from the front to the rear of the heat exchanger. In particularly hostile environments, it may be desirable to almost entirely or entirely enclose the heat exchanger 23 in a screen 33, even in the rear 27 of the heat exchanger.

The material from which the screen 33 is made can be adapted to the particular environment in which the screen will be used. For example, it may be desirable to have some screen materials have greater resistance to temperature fluctuations in some environments. It may also be desirable to have different screen mesh sizes for different environments.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A heat exchanger arrangement, comprising:
   a heat exchanger having a front, a rear, and a side between the front and the rear;
   a fan arranged at the rear of the heat exchanger to direct an airflow from the front to the rear of the heat exchanger;
   a screen disposed over at least the front and side of the heat exchanger and attached to a structure at or behind the rear of the heat exchanger, wherein the screen comprises at least one hole therein, the hole being substantially larger than openings of a mesh of the screen, wherein the screen comprises at least one slit therein, the slit extending from a peripheral edge of the screen to the at least one hole, and
   slit fastening means for fastening edges of the slit to each other.

2. The heat exchanger arrangement as set forth in claim 1, further comprising a fan shroud attached around the fan and attached to the heat exchanger, wherein the fan shroud is attached to the rear of the heat exchanger.

3. The heat exchanger arrangement as set forth in claim 2, wherein the screen is, disposed over at least part of the rear of the heat exchanger.

4. The heat exchanger arrangement as set forth in claim 1, comprising fastening means for removably attaching the screen to the structure.

5. A heat exchanger arrangement, comprising:
   a heat exchanger having a front, a rear, and a side between the front and the rear;
   a fan arranged to direct an airflow from the front to the rear of the heat exchanger;
   a screen disposed over at least the front and side of the heat exchanger and attached to a structure at or behind the rear of the heat exchanger, wherein the screen comprises at least one hole therein, the hole being substantially larger than openings of a mesh of the screen, wherein the screen comprises at least one slit therein, the slit extending from a peripheral edge of the screen to the at least one hole;
   slit fastening means for fastening edges of the slit to each other; and
   a component attached to the heat exchanger arrangement, the component extending through the at least one hole.

6. The heat exchanger arrangement as set forth in claim 5, comprising component fastening means for fastening edges of the at least one hole to the component.

7. A heat exchanger arrangement, comprising:
   a heat exchanger having a front, a rear, and a side between the front and the rear;
   a fan arranged at the rear of the heat exchanger to direct an airflow from the front to the rear of the heat exchanger; and
   a screen disposed over at least the front and side of the heat exchanger and attached to a structure at or behind the rear of the heat exchanger, wherein the screen comprises at least one slit therein, the slit extending from a peripheral edge of the screen.

8. The heat exchanger arrangement as set forth in claim 1, wherein the screen is flexible and is movable from a substantially flat shape to a shape that is bent around the heat exchanger.

9. The heat exchanger arrangement as set forth in claim 8, wherein the screen is resilient and is adapted to be stretched from a relaxed, flat shape to a bent, tensioned state around the heat exchanger.

10. The heat exchanger arrangement as set forth in claim 2, wherein the screen is attached to at least one of the fan shroud, a heat exchanger tank, a heat exchanger frame, a heat exchanger bracket.

11. The heat exchanger arrangement as set forth in claim 1, wherein the heat exchanger comprises at least one of an engine coolant heat exchanger, an exhaust gas recirculation cooler, a charge air cooler, and an engine oil heat exchanger.

12. A heat exchanger screen for a heat exchanger arrangement, the heat exchanger arrangement comprising a heat exchanger having a front, a rear, and a side between the front and the rear, and a fan arranged at the rear of the heat exchanger to direct an airflow from the front to the rear of the heat exchanger, the heat exchanger screen comprising a screen adapted to be disposed over at least a front and a side of a heat exchanger and attached to a structure at or behind the rear of the heat exchanger.

13. The heat exchanger screen as set forth in claim 12, wherein the screen is adapted to be disposed over at least part of the rear of the heat exchanger.

14. The heat exchanger screen as set forth in claim 12, comprising fastening means for removably attaching the screen to at least one of a fan shroud, a heat exchanger tank, a heat exchanger frame, a heat exchanger bracket.

15. The heat exchanger screen as set forth in claim 12, wherein the screen comprises at least one hole therein, the hole being substantially larger than openings of a mesh of the screen.

16. The heat exchanger screen as set forth in claim 15, wherein the screen comprises at least one slit therein, the slit extending from a peripheral edge of the screen to the at least one hole.

17. The heat exchanger screen as set forth in claim 12, wherein the screen comprises at least one slit therein, the slit extending from a peripheral edge of the screen.

18. A method for protecting a heat exchanger arrangement, the heat exchanger arrangement comprising a heat exchanger having a front, a rear, and a side between the front and the rear, and a fan arranged at the rear of the heat exchanger to direct an airflow from the front to the rear of the heat exchanger, comprising:
    placing a screen over at least the front and side of the heat exchanger; and
    attaching the screen to a structure at or behind the rear of the heat exchanger.

19. The method as set forth in claim 18, comprising placing the screen over at least part of the rear of the heat exchanger.

* * * * *